(12) United States Patent
Park

(10) Patent No.: US 9,063,266 B2
(45) Date of Patent: Jun. 23, 2015

(54) TRANSPARENT LIQUID CRYSTAL DISPLAY DEVICE

(71) Applicant: LG DISPLAY CO., LTD., Seoul (KR)

(72) Inventor: Kiduck Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 14 days.

(21) Appl. No.: 14/107,440

(22) Filed: Dec. 16, 2013

(65) Prior Publication Data

US 2015/0002783 A1    Jan. 1, 2015

(30) Foreign Application Priority Data

Jun. 28, 2013  (KR) .................. 10-2013-0076039

(51) Int. Cl.
*G02F 1/133* (2006.01)
*F21V 8/00* (2006.01)
*G02F 1/1335* (2006.01)

(52) U.S. Cl.
CPC ............ G02B 6/0081 (2013.01); *G02B 6/0063* (2013.01); *G02B 6/0068* (2013.01); G02B 6/0076 (2013.01); G02F 1/133615 (2013.01); *G02F 1/133603* (2013.01); *G02B 6/0036* (2013.01); *G02B 6/0055* (2013.01)

(58) Field of Classification Search
CPC ..................... G02F 1/133615; G02F 1/133603
See application file for complete search history.

(56) References Cited

U.S. PATENT DOCUMENTS

2010/0039414 A1* 2/2010 Bell .............................. 345/207

* cited by examiner

*Primary Examiner* — Phu Vu
(74) *Attorney, Agent, or Firm* — Brinks Gilson & Lione

(57) ABSTRACT

A transparent liquid crystal display device includes a liquid crystal display panel displaying an image in an image display mode and transparently implementing in a transparent mode; a backlight unit including a light guide plate disposed on a rear surface of the liquid crystal display panel and a light source array disposed at one side of the light guide plate; a light source driving unit supplying a driving current to the light sources; a cover bottom enclosing an edge of the side and rear surfaces of the backlight unit; and an illumination sensor measuring illumination of an external light incident to the rear surface of the cover bottom.

21 Claims, 10 Drawing Sheets

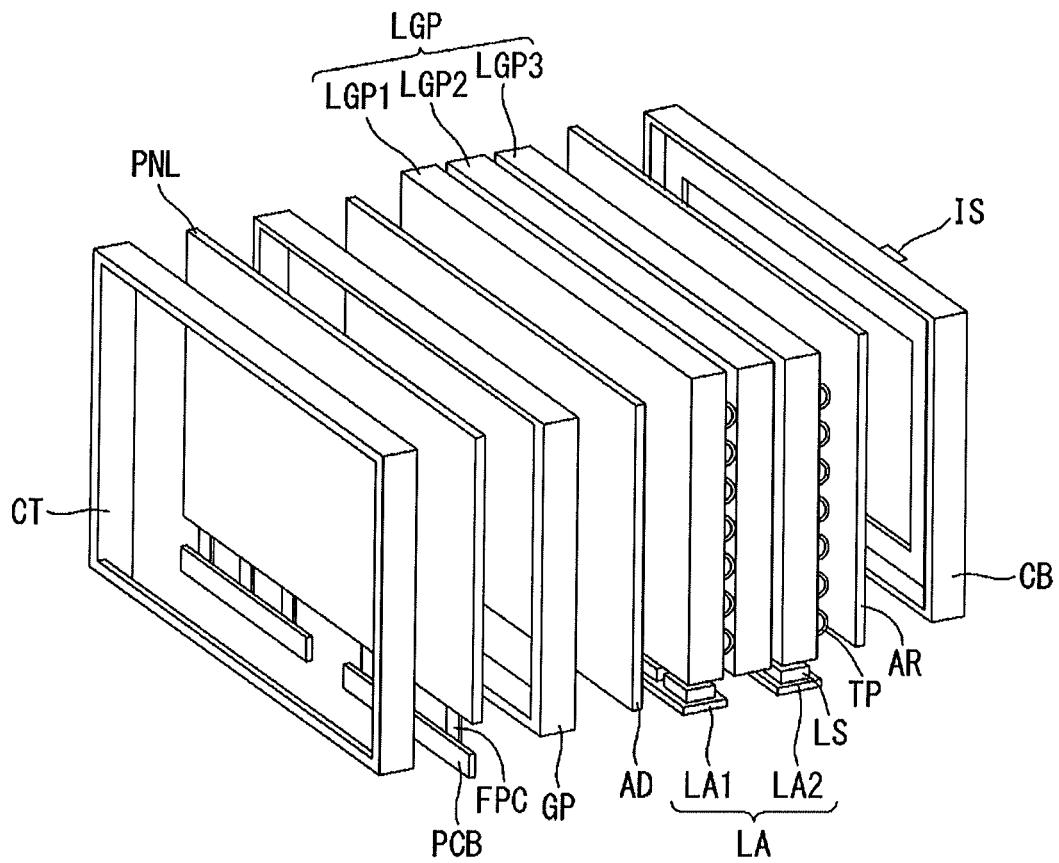
Fig. 6
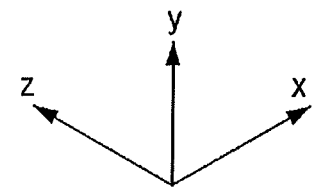

TRANSPARENT LIQUID CRYSTAL DISPLAY DEVICE

This application claims the priority benefit of Korean Patent Application No. 10-2013-0076039 filed on Jun. 28, 2013, which is incorporated herein by reference for all purposes as if fully set forth herein.

BACKGROUND

1. Field

The present disclosure relates to a transparent liquid crystal display device implemented transparently when an image is not displayed.

2. Related Art

A liquid crystal display device has characteristics such as light weight, a small thickness, low power consumption, and the like, such that application fields for the use thereof have increased. The liquid crystal display device has been widely used in a portable computer such as a notebook computer, an office automation device, an audio/video device, indoor and outdoor advertising display device, and the like. The liquid crystal display device controls an electric field applied to the liquid crystal layer and modulates a light incident from a backlight unit, thereby displaying an image.

The liquid crystal display device has been changed in various forms in accordance with requests of customers. As an example, when the image is not displayed, a transparent liquid crystal display device implemented transparently like glass has been recently developed. The transparent liquid crystal display device is implemented transparently when the image is not displayed, such that the obscured object or landscape locating behind the transparent liquid crystal display device may be seen through the transparent liquid crystal display device. For example, the transparent liquid crystal display device may be implemented in a window. In this case, a user may watch the image through the transparent liquid crystal display device and the outside landscape through the transparent liquid crystal display device implemented transparently in a transparent mode in which does not display the image.

However, the liquid crystal display device includes optical sheets, a light guide plate and a reflection sheet sequentially stacked on a lower portion of a liquid crystal display panel, such that it is difficult to transparently implement the liquid crystal display device. In order to implement the transparent liquid crystal display device, a rear surface of the liquid crystal display panel needs to be designed in a structure which is transmitting light.

FIG. 1 is a perspective view showing a configuration of a transparent liquid crystal display device according to the related art. Referring to FIG. 1, a light source array LA including light sources LS is implemented in edge type backlight unit disposed at a side rather than on a rear surface of a liquid crystal display panel PNL. In addition, the optical sheets and the reflection sheet need to be removed and a cover bottom (not shown) should be implemented so as to enclose edge of the side and rear surface of the backlight unit.

Meanwhile, a light L generated from the light sources LS of the light source array LA moves to a front surface or the rear surface of the light guide plate LGP by the light guide plate LGP as shown in FIG. 2. A portion of the light L moved to the rear surface of the light guide plate LGP is refracted by convex patterns P to move to the front surface, but the remaining light moves toward the outside of the rear surface in the light guide plate LGP. However, since the transparent liquid crystal display device does not include the reflection sheet, the light moving toward the outside of the rear surface in the light guide plate LGP is lost. Therefore, a luminance of the transparent liquid crystal display device is largely lowered. In addition, the convex patterns P of the light guide plate LGP according to the related art are opaquely implemented, such that the convex patterns P are visible by the user in the transparent mode.

SUMMARY

A transparent liquid crystal display device comprises: a liquid crystal display panel displaying an image in an image display mode and transparently implementing in a transparent mode; a backlight unit including a light guide plate disposed on a rear surface of the liquid crystal display panel and a light source array disposed at one side of the light guide plate; a light source driving unit supplying a driving current to the light sources in order to drive the light sources of the light source array; a cover bottom enclosing an edge of the side and rear surfaces of the backlight unit; and an illumination sensor measuring illumination of an external light incident to the rear surface of the cover bottom, wherein, the light source driving unit controls to turn off the light sources when the illumination is equal to or higher that a threshold.

In another aspect, a transparent liquid crystal display device comprises: a liquid crystal display panel; a backlight unit including a light guide plate disposed on a rear surface of the liquid crystal display panel and a light source array disposed at one side of the light guide plate; and a cover bottom enclosing an edge of the side and rear surface of the backlight unit, wherein, the light guide plate, comprises: a first light guide plate facing the liquid crystal display panel and including transparent convex patterns formed on an opposite surface to a surface facing the liquid crystal display panel; and a second light guide plate facing the cover bottom and including transparent convex patterns formed on a surface facing the cover bottom.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 6 is an exploded perspective view showing a transparent liquid crystal display device according to second exemplary embodiment of the present invention;

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
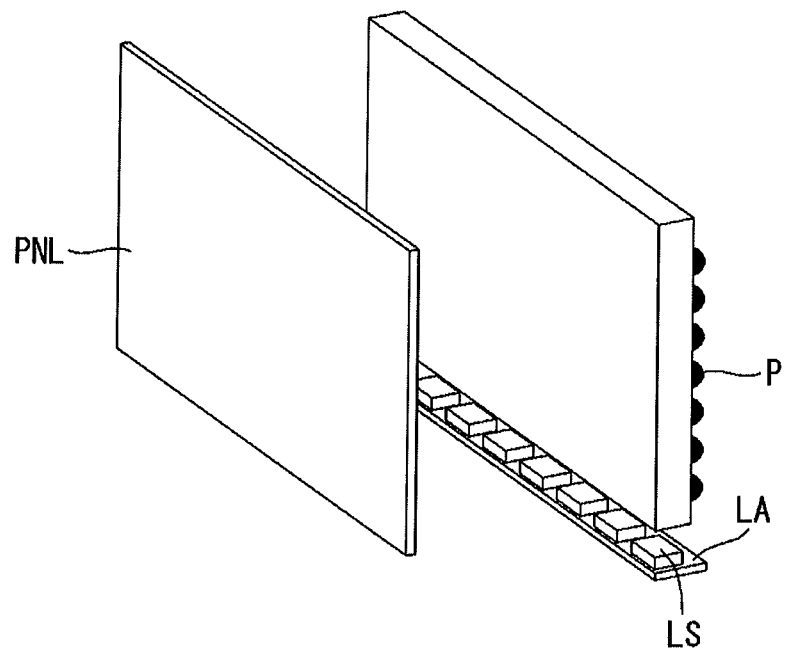
FIG. 1 is an exploded perspective view showing a configuration of a transparent liquid crystal display device according to the related art.
Figure 2:
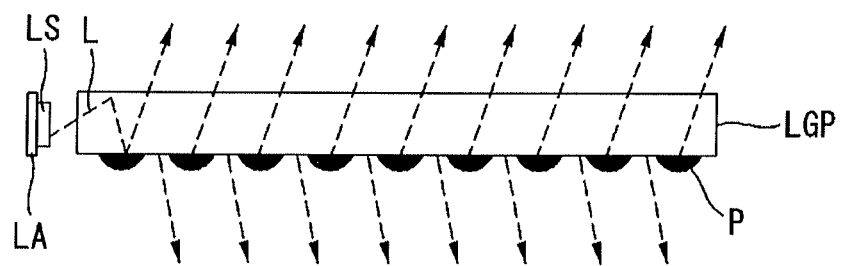
FIG. 2 is a detailed side view showing a light source array and a light guide plate of FIG. 1.
Figure 3:
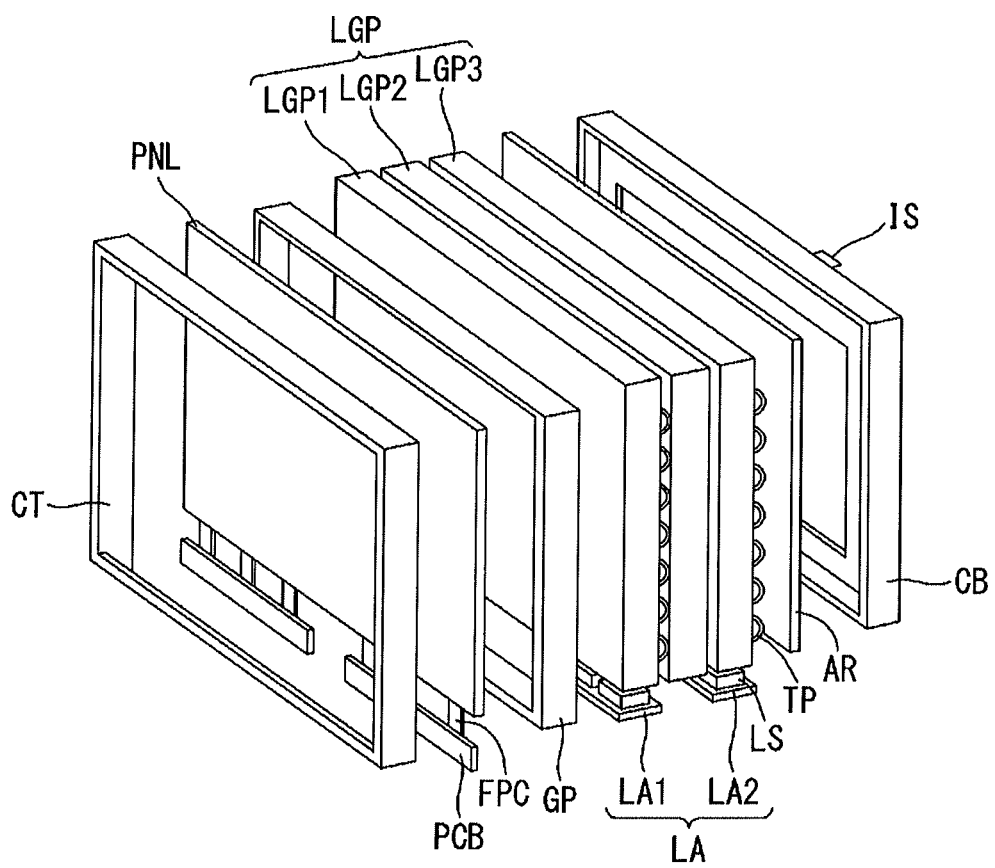
FIG. 3 is an exploded perspective view showing a transparent liquid crystal display device according to first exemplary embodiment of the present invention.
Figure 3:
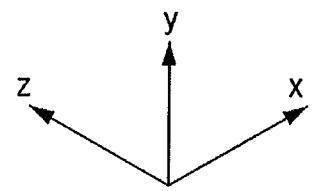

FIG. 3 is an exploded perspective view showing a transparent liquid crystal display device according to first exemplary embodiment of the present invention. Referring to FIG. 3, a liquid crystal display device according to first exemplary embodiment of the present invention includes a liquid crystal display panel PNL, a driving unit for driving the liquid crystal display panel PNL, a backlight unit, a guide/case member supporting the liquid crystal display panel PNL and the backlight unit, a light source driving unit, and the like.

The liquid crystal display panel PNL includes a liquid crystal layer formed between two glass substrates. A plurality of data lines and a plurality of gate lines intersect with each other on a lower glass substrate of the liquid crystal display panel PNL. The liquid crystal display panel PNL is provided with liquid crystal cells arranged in a matrix form by an intersection structure of the data lines and the gate lines. In addition, a thin film transistor (TFT), a pixel electrode of the liquid crystal cell connected to the TFT, a storage capacitor, and the like are formed on the lower glass substrate of the liquid crystal display panel PNL. The liquid crystal cells are driven by an electric field generated by a potential difference between a data voltage supplied to the pixel electrode through the data lines and a common voltage supplied to a common electrode to adjust the amount of light transmitted in the liquid crystal display panel PNL.

A black matrix, a color filter, and the common electrode are formed on an upper glass substrate of the liquid crystal display panel PNL. The common electrode is formed on the upper glass substrate in a vertical electric field driving mode such as a twisted nematic (TN) mode or a vertical alignment (VA) mode and on the lower glass substrate together with the pixel electrode in a horizontal electric field driving mode such as an in plane switching (IPS) mode or a fringe field switching (FFS) mode. An upper polarizing plate is attached on the upper glass substrate of the liquid crystal display panel PNL and a lower polarizing plate is attached on the lower glass substrate thereof. The upper polarizing plate and the lower polarizing plate may be orthogonalized to each other. An alignment layer is formed on the inner surface contacting with the liquid crystal of the liquid crystal layer in order to set a pre-tilt angle of the liquid crystal.

The liquid crystal display panel PNL displays the image in the image display mode and is transparently implemented in the transparent mode. In detail, the liquid crystal cells of the liquid crystal display panel PNL represent a black gradation, a gray gradation and a white gradation in the image display mode to display the image. In 256 gradations of 8 bits, the black gradation indicates G0 to G63, the gray gradation indicates G64 to G191, and the white gradation indicates G192 to G255. The liquid crystal cells of the liquid crystal display panel PNL may represent a peak white gradation in the transparent mode. The 256 gradations of the 8 bits, a peak black gradation indicates G0 and a peak white gradation indicates G255.

The liquid crystal display panel PNL may be implemented in a normally black mode or a normally white mode. The normally black mode means a mode that the liquid crystal cell represents the peak black gradation in a state in which the voltage is not applied to the pixel electrode and the common electrode of the liquid crystal cell. In the normally black mode, as a voltage difference between the pixel electrode and the common electrode of the liquid crystal cell increases, the liquid crystal cell is represented in the high gradation. The normally white mode means a mode that the liquid crystal cell represents the peak white gradation in a state in which the voltage is not applied to the pixel electrode and the common electrode of the liquid crystal cell. In the normally white mode, as the voltage difference between the pixel electrode and the common electrode of the liquid crystal cell increases, the liquid crystal cell is represented in the low gradation. Meanwhile, the TN mode is known as the normally white mode and the IPS mode is known as the normally black mode.

The driving unit of the liquid crystal display panel PNL includes a gate driving unit, a data driving unit, and a timing controlling unit. The data driving unit and the timing controlling unit may be mounted on a printed circuit board PCB connected to the liquid crystal display panel PNL through a flexible printed circuit FPC. The gate driving unit may be mounted in a bezel area of the side of the liquid crystal display panel PNL in a gate drive IC in panel (GIP) type. The bezel area means a non-display area of the liquid crystal display panel PNL.

The data driving unit is configured to include a plurality of data drive integrated circuits. The data driving unit converts a digital video data into a positive polarity/negative polarity analog data voltage using a positive polarity/negative polarity gamma compensation voltage under controlling of the timing controlling unit and then, supplies to the data lines. The gate driving unit sequentially outputs a gate pulse (or scan pulse) under controlling of the timing controlling unit and then, supplies to the gate lines.

The timing controlling unit receives the timing signals and the digital video data input from a system board on which an external video source is mounted in the image display mode. The timing signals may include a vertical synchronizing signal, a horizontal synchronizing signal, a data enable signal, a dot clock signal, and the like. In addition, the timing controlling unit receives the timing signals and the digital video data corresponding to the peak white gradation from the memory in the transparent mode. The timing controlling unit generates timing controlling signals for controlling an operation timing of the data driving unit and the gate driving unit based on the digital video data and the timing signals. The timing controlling unit outputs the timing controlling signals to the data driving unit and the gate driving unit in order to control the operation timing of the data driving unit and the gate driving unit.

The backlight unit includes the light source array LA, the light guide plate LGP, and the like. The backlight unit according to the exemplary embodiment of the present invention is implemented in an edge type backlight unit. That is, the backlight unit has a structure in which the light guide plate LGP is disposed under the liquid crystal display panel PNL and the light source array LA is disposed at the side of the light guide plate LGP.

The light source array LA includes a first and second light source arrays LA1 and LA2. Each of the first and second light source arrays LA1 and LA2 includes the light sources LS and the printed circuit board in which the light sources LS are mounted. The light sources LS may be implemented by a light emitting diode (hereinafter, referred to as an LED) package having a high efficiency, a high luminance, a low power consumption, and the like. The light sources LS are turned on or off by receiving the driving current from the light source driving unit through the printed circuit board. The detailed description for the turn-on and the turn-off of the light sources LS will be described below with reference to FIGS. 5A and 5B. The printed circuit board is provided with a circuit for electrically connecting the light sources LS and the light source driving unit. The printed circuit board may be formed of a metal and may be manufactured by aluminum with excellent heat radiating property.

The light guide plate LGP converts the light from the light sources LS of the light source array LA into a surface light source to irradiate to the display panel 10. In detail, the light from the light sources LS of the light source array LA is irradiated to the side of the light guide plate LGP to diffuse to the entire area of the inner portion of the light guide plate LGP and is then refracted toward the liquid crystal display panel PNL.

Figure 4:
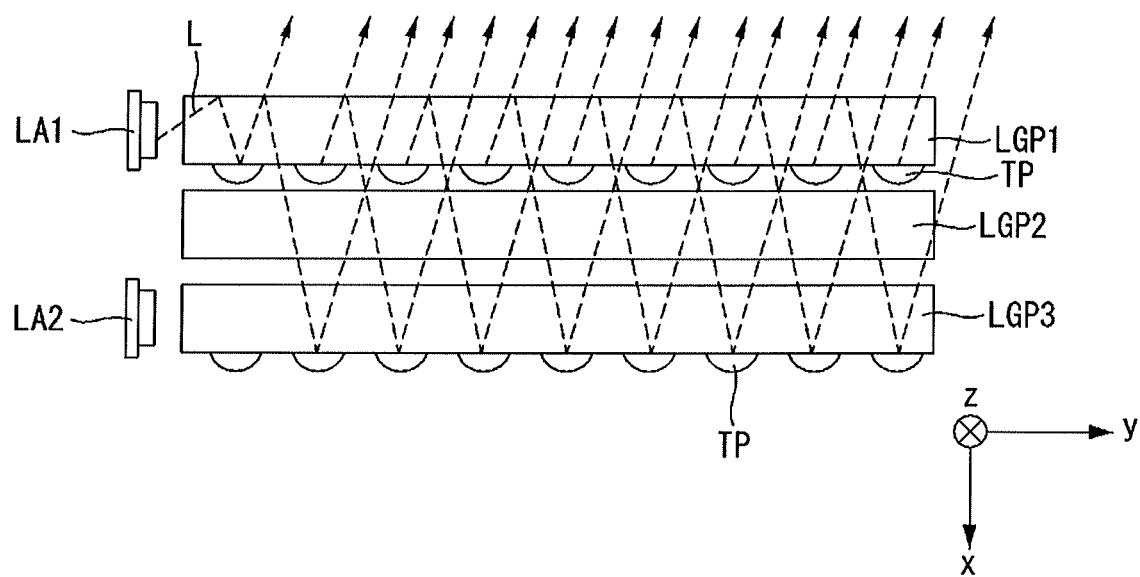
FIG. 4 is a detailed side view showing first to third light guide plates of FIG. 3.

As shown in FIG. 4, the light guide plate LGP may include the first to third light guide plates LGP1, LGP2, and LGP3. The first light guide plate LGP1 is disposed to face the liquid crystal display panel PNL, the second light guide plate LGP2 is disposed to face the cover bottom CB, and the third light guide plate LGP3 is disposed between the first and second light guide plates LGP1 and LGP2. The first light source array LA1 is disposed at the one side of the first light guide plate LGP1 to irradiate the light to the one side of the first light guide plate LGP1 and the second light source array LA2 is disposed at the one side of the second light guide plate LGP2 to irradiate the light to the one side of the second light guide plate LGP2. The third light guide plate LGP3 may be omitted in order to adjust a thickness of the first and second light guide plates LGP1 and LGP2 and a thickness of the first and second light source arrays LA1 and LA2.

The convex patterns TP are formed on the rear surface of the first and second light guide plates LGP1 and LGP2. The rear surface according to the exemplary embodiment of the present invention indicates an x axis direction as shown in FIGS. 3 and 4. As shown in FIG. 4, the convex patterns TP refract the light toward to the rear surface of the first and second light guide plates LGP1 and LGP2 to the front surface. In this case, the light refracted by the convex patterns TP may proceed to the liquid crystal display panel PNL. The convex patterns TP may be implemented by a prism form, a lenticular form or a micro lens form. The convex patterns TP are implemented in the transparent patterns in order to prevent from being recognized by a user in the transparent mode. In this case, the convex patterns TP do not include an opaque dispersing agent and may be formed of a spotted ink or a chlorinated ink.

The exemplary embodiment of the present invention may proceed the light from the rear surface of the light guide plate LGP to the front surface of the light guide plate LGP on which the liquid crystal display panel PNL is disposed using the plurality of light guide plates LGP1 and LGP2 in which the plurality of light source arrays LA1 and LA2 and the transparent convex patterns TP are formed as shown in FIG. 4. For example, the light from the light sources of the first light source array LA1 is not refracted by the convex pattern TP of the first light guide plate LGP1. Although the light proceeds to the second light guide plate LGP2, the light is refracted by the convex pattern TP of the second light guide plate LGP2 to thereby proceed to the front surface of the first light guide plate LGP1. As a result, the present invention may reduce luminance loss. Therefore, the present may increase the image display quality in the image display mode and may be transparently implemented in the transparent mode. Meanwhile, the light guide plate LGP according to the exemplary embodiment of the present invention mainly describes the case in which the plurality of light guide plates is included, but is not limited thereto and may be implemented in one light guide plate.

The guide/case member includes the cover bottom CB, a guide panel GP, a case CT, and the like. The cover bottom CB is made of a quadrilateral metal frame and encloses the edge of the side and rear surface of the backlight unit. The cover bottom CB is made of a high strength steel sheet. For example, the cover bottom CB may be made of an electronic galvanized iron (EGI), a stainless (SUS), a galvalume (SGLC), an aluminum coated steel sheet (ALCOSTA), a tin coated steel (SPTE), and the like.

Meanwhile, the transparent liquid crystal display device according to the first exemplary embodiment of the present invention may further include an illumination sensor IS for measuring the illumination of the external light incident to the rear surface of the cover bottom CB. If the illumination sensor IS may measure the illumination of the external light incident to the rear surface of the cover bottom CB, the illumination sensor IS may be disposed anywhere.

The guide panel GP encloses the sides of the liquid crystal display panel PNL and the backlight unit and includes a short edge surface opposite to the sides of the liquid crystal display panel PNL and the backlight unit. The elevated platform surface of the guide panel GP supports from below the liquid crystal display panel PNL and secures a panel gap between the liquid crystal display panel PNL and the light guide plate LGP.

A case top CT has a structure enclosing the edge of the upper surface of the liquid crystal display panel PNL, the upper surface and side of the guide panel GP, the side of the cover bottom CB. The case top CT is fixed to hook or screw in any one of the guide panel GP and the cover bottom CB.

Figure 5A:
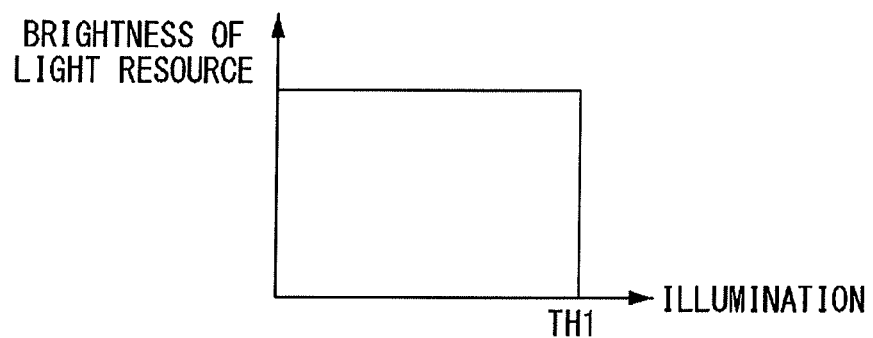
FIG. 5A is a graph showing an example of a brightness change of a light source according to illumination of an external light.

FIG. 5A is a graph showing an example of brightness change of light sources according to illumination of an external light. Referring to FIG. 5A, the liquid crystal display device according to the first exemplary embodiment of the present invention may turn on or off the light sources according to the illumination of the external light. In detail, since the external light incident to the rear surface of the cover bottom CB may serve as the backlight when the illumination of the external light is equal to or higher than the first threshold TH1, the liquid crystal display device according to the first exemplary embodiment of the present invention turns off the light sources. That is, the light source driving unit supplies the driving current to turn off the light sources when the illumination of the external light is equal to or higher than the first threshold TH1. In addition, since the external light may not serve as the backlight when the illumination of the external light is smaller than the first threshold TH1, the liquid crystal display device according to the first exemplary embodiment of the present invention turns on the light sources.

As described above, the liquid crystal display device according to the first exemplary embodiment of the present invention may display the image or may be transparently implemented without turn on of the light sources when the illumination of the external light is equal to or higher than the first threshold. As a result, the first exemplary embodiment of the present invention may reduce the power consumption.

Figure 5B:
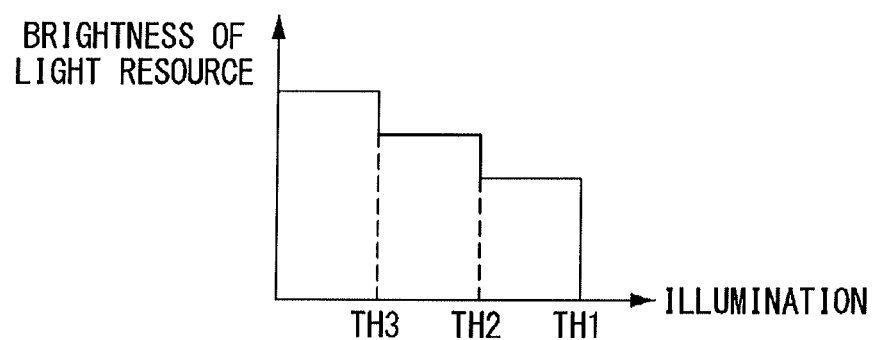
FIG. 5B is a graph showing another example of a brightness change of a light source according to illumination of the external light.

FIG. 5B is a graph showing another example of a brightness change of a light source according to illumination of the external light. Referring to FIG. 5B, the liquid crystal display device according to the first exemplary embodiment of the present invention may change the brightness of the light sources according to the illumination of the external light. In detail, since the external light incident to the rear surface of the cover bottom CB may serve as the backlight when the illumination of the external light is equal to or higher than the first threshold TH1, the liquid crystal display device according to the first exemplary embodiment of the present invention turns off the light sources. That is, the light source driving unit supplies the driving current to turn off the light sources when the illumination of the external light is equal to or higher than the first threshold TH1. In addition, the liquid crystal display device according to the first exemplary embodiment of the present invention differently controls the brightness of the light sources according to the illumination of the external light when the illumination of the external light is smaller than the first threshold TH1. That is, light source driving unit supplies the driving current so that the brightness of the light sources is changed according to the illumination of the external light when the illumination of the external light is smaller than the first threshold TH1. For example, the light sources the case in which the illumination of the external light is smaller than the first threshold TH1 and equal to or higher than a second threshold TH2 has a brightness lower than that of the case in which the illumination of the external light is smaller than the second threshold TH2 and equal to or higher than a third threshold TH3. In addition, the light sources of the case in which the illumination of the external light is smaller than the second threshold TH2 and equal to or higher than the third threshold TH3 has the brightness lower than that of the case in which the illumination of the external light is smaller than the third threshold TH3.

As described above, the liquid crystal display device according to the first exemplary embodiment of the present invention may display the image or may be transparently implemented without turn on of the light sources when the illumination of the external light is equal to or higher than the first threshold. Further, the liquid crystal display device according to the first exemplary embodiment of the present invention differently controls the brightness of the light sources according to the illumination of the external light when the illumination of the external light is smaller than the first threshold TH1. As a result, the first exemplary embodiment of the present invention may reduce the power consumption.

FIG. 6 is an exploded perspective view showing a transparent liquid crystal display device according to first exemplary embodiment of the present invention. Referring to FIG. 6, a liquid crystal display device according to second exemplary embodiment of the present invention includes a liquid crystal display panel PNL, a driving unit for driving the liquid crystal display panel PNL, a backlight unit, a guide/case member supporting the liquid crystal display panel PNL and the backlight unit, a light source driving unit, an active diffusion plate AD, an active reflection plate AR, and the like.

The liquid crystal display panel PNL, the driving unit for driving the liquid crystal display panel PNL, the backlight unit, the guide/case member supporting the liquid crystal display panel PNL and the backlight unit, and the light source driving unit according to the second exemplary embodiment of the present invention are substantially the same as the first exemplary embodiment of the present invention described with reference to FIGS. 3 to 5. Therefore, the detailed description thereof will be omitted. Hereinafter, the active diffusion plate AD and the active reflection plate AR will be described in detail.

The active diffusion plate AD is disposed between the liquid crystal display panel PNL and the light guide plate LGP. As shown in FIG. 8A, the active diffusion plate AD has the different light diffusivity and transmissivity according to whether or not the driving voltage is applied. The detailed description of the active diffusion plate AD will be described below with reference to FIGS. 7 to 9.

The active reflection plate AR is disposed between the light guide plate LGP and the cover bottom CB. As shown in FIG. 8B, the active reflection plate AR has the different light reflectivity and transmissivity according to whether or not the driving voltage is applied. The detailed description of the active reflection plate AR will be described below with reference to FIGS. 7 to 9.

Figure 7:
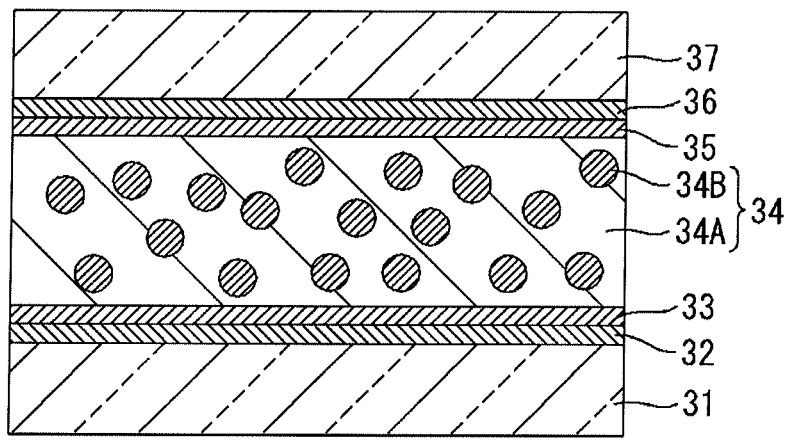
FIG. 7 is a cross-sectional view showing an active diffusion plate and an active reflection plate of FIG. 6.
Figure 7:
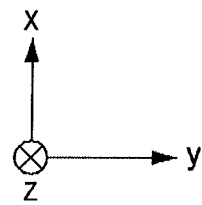
Figure 8A:
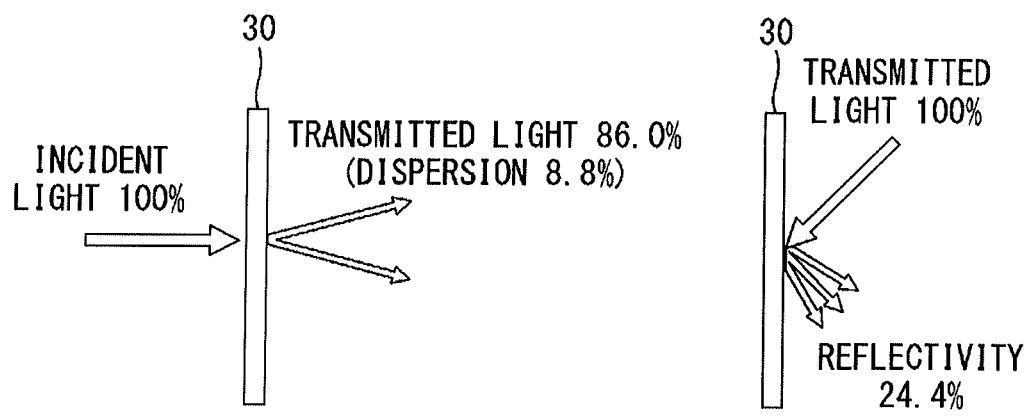
FIG. 8A is a view showing a light transmissivity, a light diffusivity, and a light reflectivity of a polymer dispersed liquid crystal cell at the time of applying a driving voltage.
Figure 8B:
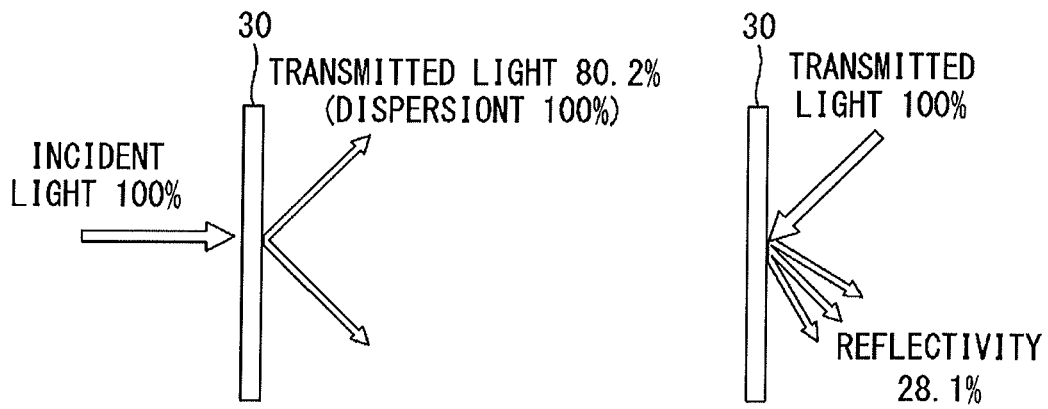
FIG. 8B is a view showing a light transmissivity, a light diffusivity, and a light reflectivity of a polymer dispersed liquid crystal cell at the time of not applying a driving voltage.

FIG. 7 is a cross-sectional view showing an active diffusion plate and an active reflection plate of FIG. 6. The active diffusion plate AD and the active reflection plate AR may be implemented in a polymer dispersed liquid crystal cell 30 using a polymer dispersed liquid crystal (PLDC) as shown in FIG. 7. The polymer dispersed liquid crystal cell 30 may be implemented to include a lower transparent substrate 31, a lower electrode 32, a lower alignment layer 33, a liquid crystal layer 34, an upper alignment layer 35, an upper electrode 36, and an upper transparent substrate 37.

The lower and upper transparent substrates 31 and 37 are made of transparent substrates against visible light, for example, a glass substrate or a plastic film. The lower electrode 32 is formed on the lower transparent substrate 31 and an insulation layer may be formed on the lower electrode 32. The lower alignment layer 33 is formed on the lower electrode 32. The upper electrode 36 is formed on the upper transparent substrate 37 and the insulation layer may be formed on the upper electrode 36. The upper alignment layer 35 is formed on the upper electrode 36. The lower alignment layer 33 and the upper alignment layer 35 have the liquid crystal layer 34 interposed therebetween. Since the polymer dispersed liquid crystal PLDC of the liquid crystal layer 34 is differently arranged according to whether or not the driving voltage is applied, the light transmissivity, the light diffusivity, and the light reflectivity are changed according to whether or not the driving voltage is applied.

FIG. 8A is a view showing a light transmissivity, a light diffusivity, and a light reflectivity of a polymer dispersed liquid crystal cell at the time of applying a driving voltage and FIG. 8B is a view showing a light transmissivity, a light diffusivity, and a light reflectivity of a polymer dispersed liquid crystal cell at the time of not applying a driving voltage. Referring to FIGS. 8A and 8B, when the driving voltage is applied, the polymers dispersed liquid crystal PLDC of the liquid crystal layer 34 are arranged in a predetermined direction to transmit about 86% of the incident light, disperse about 8.8%, and reflect about 24.4%. In addition, when the driving voltage is not applied, the polymers dispersed liquid crystal PLDC of the liquid crystal layer 34 are arranged in an initial arrangement state to transmit about 80.2% of the incident light, disperse about 100%, and reflect about 28.1%.

Figure 9:
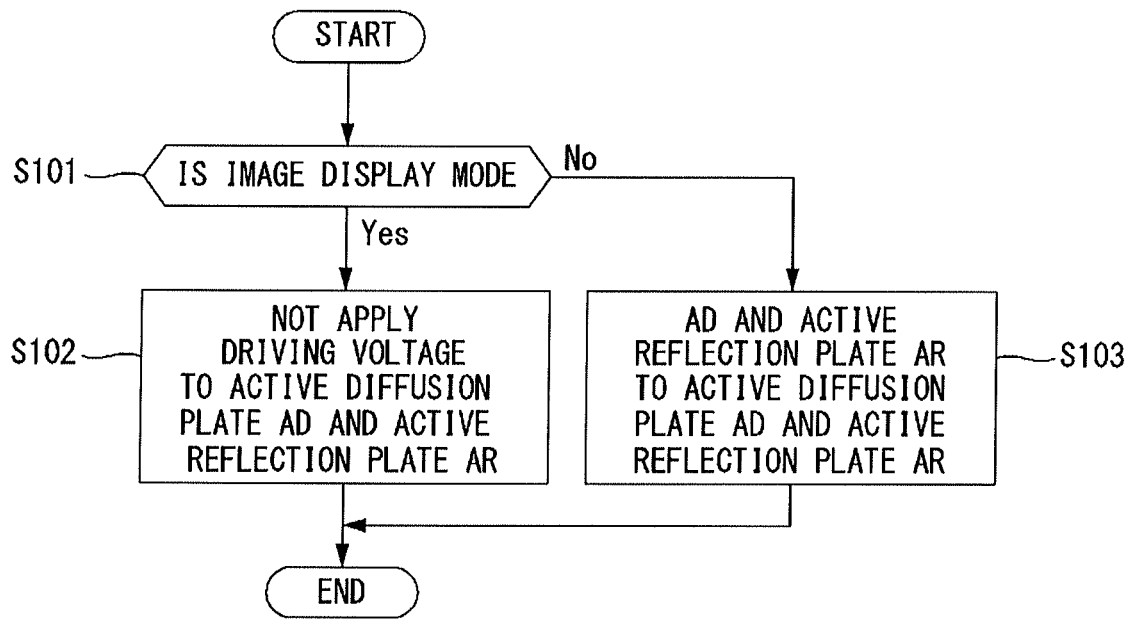
FIG. 9 is a flowchart showing an operation of an active diffusion plate and an active reflection plate in an image display mode and a transparent mode.

FIG. 9 is a flowchart showing an operation of an active diffusion plate and an active reflection plate in an image display mode and a transparent mode. Referring to FIG. 9, the active diffusion plate AD in the image display mode serves as the diffusion plate dispersing the light incident from the light guide plate LGP in order to uniformly supply the light over the front surface of the liquid crystal display panel PNL. As shown in FIG. 8B, since the active diffusion plate AD disperses about 100% of the incident light when the driving voltage is not applied, the driving voltage is not applied to the active diffusion plate AD in the image display mode.

In addition, the active reflection plate AR in the image display mode serves as the reflection plate reflecting the light incident from the light guide plate LGP. As shown in FIGS. 8A and 8B, since the active reflection plate AR when the driving voltage is not applied has a diffuse reflectance higher than that of when the driving voltage is applied, the driving voltage is not applied to the active reflection plate AR in the image display mode (S101 and S102).

In the transparent mode, the active diffusion plate AD and the active reflection plate AR are transparently implemented. As shown in FIGS. 8A and 8B, since the active diffusion plate AD and the active reflection plate AR when the driving voltage is applied have the transmissivity higher than that of when the driving voltage is not applied, the driving voltage is applied to the active diffusion plate AD and the active reflection plate AR in the transparent mode (S103).

As described above, the driving voltage is not applied to the active diffusion plate AD and the active reflection plate AR in the image display mode. Therefore, the active diffusion plate AD serves as the diffusion plate and the active reflection plate AR serves as the reflection plate. In addition, the driving voltage is applied to the active diffusion plate AD and the active reflection plate AR in the transparent mode. Therefore, the active diffusion plate AD and the active reflection plate AR are transparently implemented in the transparent mode. Therefore, the present invention, in the transparent mode, transparently implements the active diffusion plate AD and the active reflection plate AR. The same time, the present invention, in the image display mode, reflects the light from the light guide plate LGP through the active reflection plate AR, thereby reducing the power consumption and diffuses the light from the light guide plate LGP to the front surface of the PNL through the active diffusion plate AD, thereby increasing the image display quality.

Figure 10:
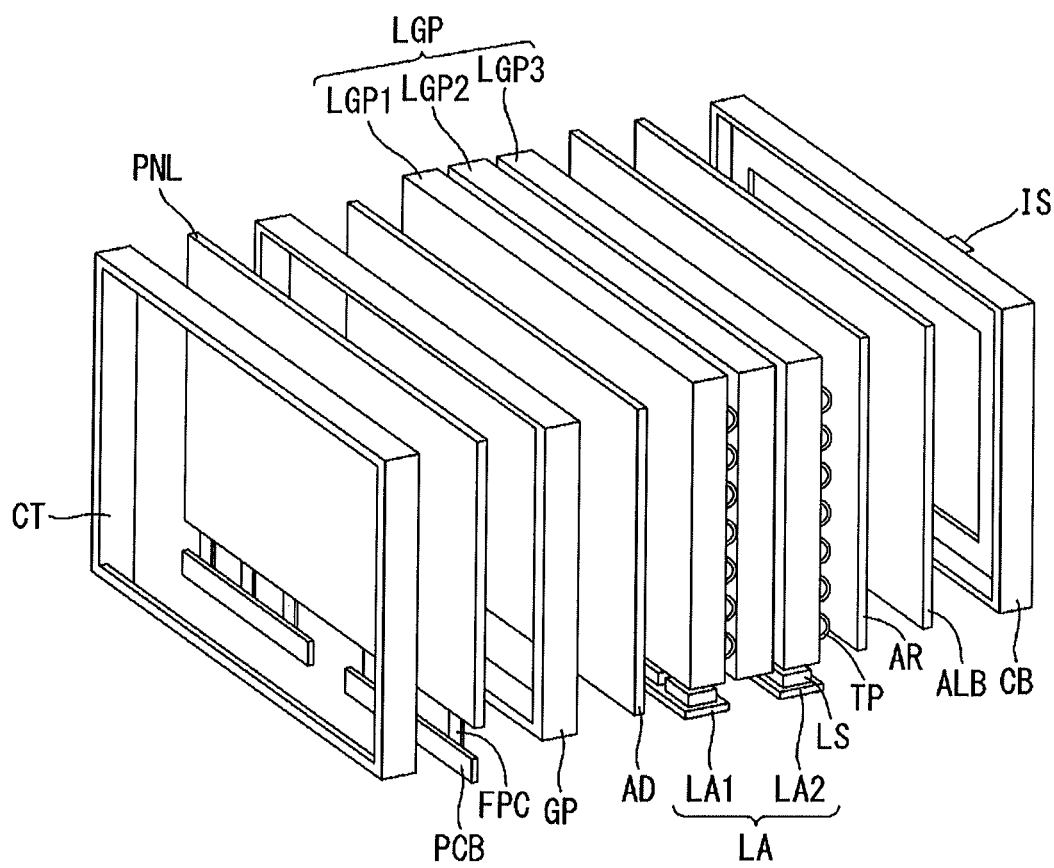
FIG. 10 is an exploded perspective view showing a transparent liquid crystal display device according to third exemplary embodiment of the present invention.

FIG. 10 is an exploded perspective view showing a transparent liquid crystal display device according to first exemplary embodiment of the present invention. Referring to FIG. 10, a liquid crystal display device according to thirdexemplary embodiment of the present invention includes a liquid crystal display panel PNL, a driving unit for driving the liquid crystal display panel PNL, a backlight unit, a guide/case member supporting the liquid crystal display panel PNL and the backlight unit, a light source driving unit, an active diffusion plate AD, an active reflection plate AR, an active light blind ALB, and the like.

The liquid crystal display panel PNL, the driving unit for driving the liquid crystal display panel PNL, the backlight unit, the guide/case member supporting the liquid crystal display panel PNL and the backlight unit, and the light source driving unit according to the third exemplary embodiment of the present invention are substantially the same as the first exemplary embodiment of the present invention described with reference to FIGS. 3 to 5. Therefore, the detailed description thereof will be omitted. In addition, the active diffusion plate AD and the active reflection plate AR according to the third exemplary embodiment of the present invention are substantially the same as the second exemplary embodiment described with reference to FIGS. 7 to 9. Therefore, the detailed description thereof will be omitted. Meanwhile, the active diffusion plate AD and the active reflection plate AR according to the third exemplary embodiment of the present invention may be omitted. Hereinafter, the active light blind ALB according to the third exemplary embodiment of the present invention will be described in detail.

The active light blind ALB is disposed between the active reflection plate AR and the cover bottom CB. If the active reflection plate AR is omitted, the active light blind ALB is disposed between the light guide plate LGP and the cover bottom CB.

Figure 11:
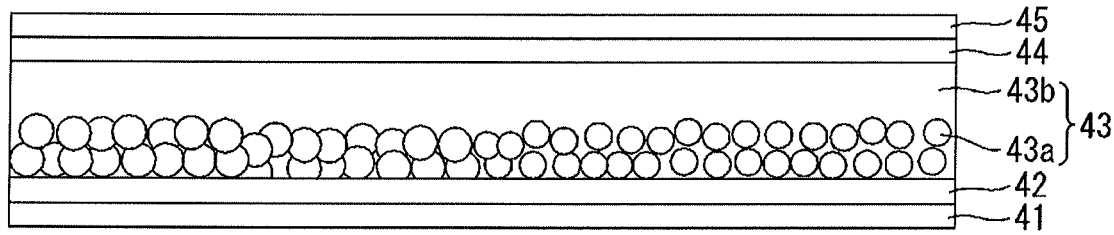
FIG. 11 is a cross-sectional view showing an example of electrochromic device.

The active light blind ALB may be formed in an electrochromic device (ECD) 40 as shown in FIG. 11. The ECD device 40 is a device which color is reversibly changed by applying the voltage from the outside using the principal of electrochromic which color is changed when the driving voltage is applied. Since the ECD device 40 uses absorption of natural light, there are advantages that a shading rate is higher than that of the polymer dispersed liquid crystal cell and the power consumption is lower than that of the polymer dispersed liquid crystal cell FIG. 11 is a cross-sectional view showing an example of electrochromic device of FIG. 9. Referring to FIG. 11, the electrochromic device 40 may be implemented to include a lower transparent substrate 41, a lower electrode 42, an electrochromic layer 43, an upper electrode 44 and an upper transparent substrate 45. The lower and upper transparent substrates 41 and 45 are made of transparent substrates against visible light, for example, a glass substrate or a plastic film. The lower electrode 42 is formed on the lower transparent substrate 41 and an insulation layer may be formed on the lower electrode 42. The upper electrode 44 is formed on the upper transparent substrate 45 and the insulation layer may be formed on the upper electrode 44. The lower alignment layer 42 and the upper alignment layer have the electrochromic layer 43 interposed therebetween. The electrochromic layer 43 includes an electrochromic material 43a and a solid electrolyte 43b. The electrochromic layer 43 is implemented to penetrate or block the light which is incidence by an oxidation and a reducing action according to the voltage which is applied to the lower electrode 42 and the upper electrode 44.

The electrochromic layer 43 of the active light blind ALB is implemented to block the light which is incidence in the image display mode, and is implemented to penetrate the light which is incidence in the transparent mode. As a result, the present invention may prevent leaking the light which penetrates the active reflection plate AR through the active light blind ALB into the cover bottom CB in the image display mode.

In addition, the active light blind ALB may be implemented to a suspended particle device (SPD) film 50. The SPD film has a light absorption particle forming the opaque film, and when the driving voltage is applied, the light absorption particle is perpendicularly arranged so that the SPD film becomes transparent. Accordingly, the SPD film of the active light blind ALB is implemented opaquely to block the light which is incidence in the image display mode by not applying the driving voltage, and is implemented transparently to transmit the light which is incidence in the transparent mode by applying the driving voltage. As a result, the present invention may prevent leaking the light which penetrates the active reflection plate AR through the active light blind ALB into the cover bottom CB in the image display mode.

Figure 12:
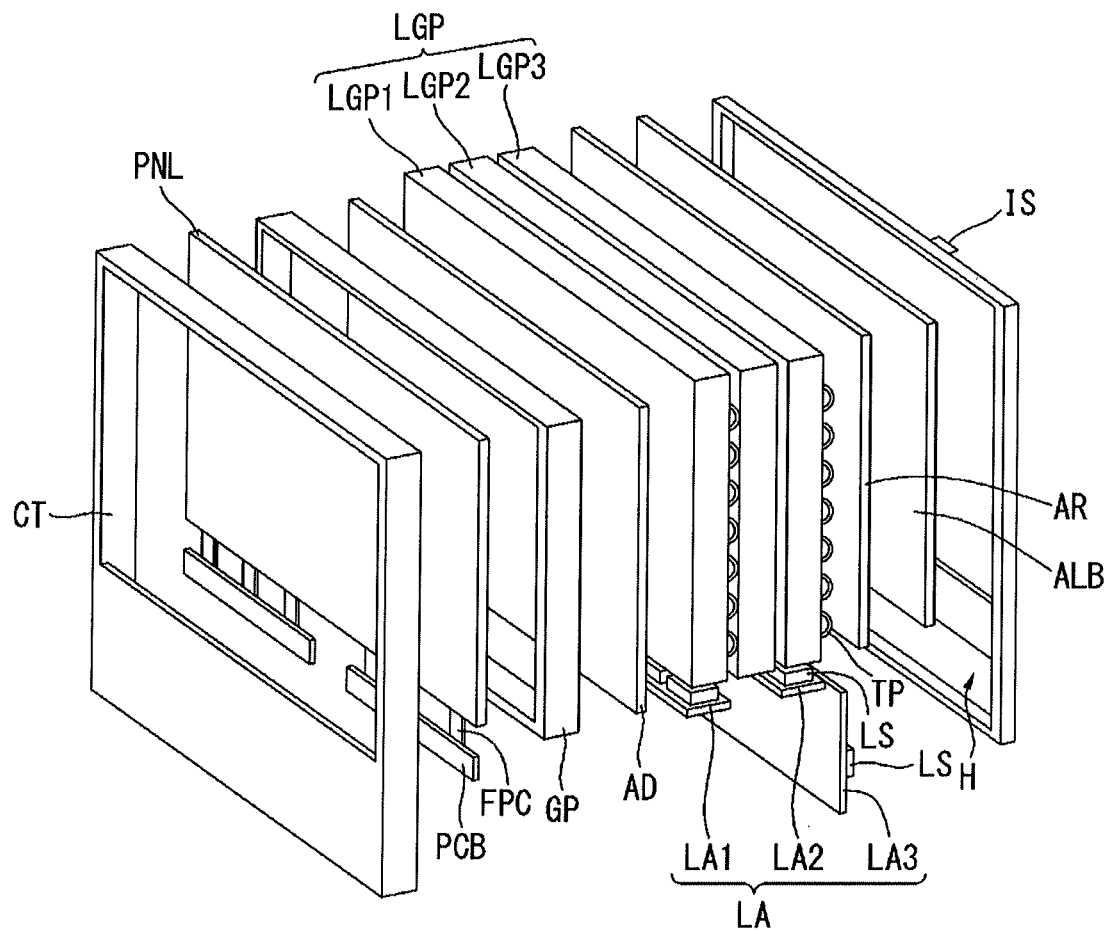
FIG. 12 is an exploded perspective view showing a transparent liquid crystal display device according to fourth exemplary embodiment of the present invention.

FIG. 12 is an exploded perspective view showing a transparent liquid crystal display device according to fourth exemplary embodiment of the present invention. Referring to FIG. 12, a liquid crystal display device according to fourth exemplary embodiment of the present invention includes a liquid crystal display panel PNL, a driving unit for driving the liquid crystal display panel PNL, a backlight unit, a guide/case member supporting the liquid crystal display panel PNL and the backlight unit, a light source driving unit, an active diffusion plate AD, an active reflection plate AR, an active light blind ALB, an auxiliary light source array LA3 and the like.

The liquid crystal display panel PNL, the driving unit for driving the liquid crystal display panel PNL, the backlight unit, the guide/case member supporting the liquid crystal display panel PNL and the backlight unit, and the light source driving unit according to the fourth exemplary embodiment of the present invention are substantially the same as the first exemplary embodiment of the present invention described with reference to FIGS. 3 to 5. Therefore, the detailed description thereof will be omitted. In addition, the active diffusion plate AD and the active reflection plate AR according to the fourth exemplary embodiment of the present invention are substantially the same as the second exemplary embodiment described with reference to FIGS. 6 to 9. Therefore, the detailed description thereof will be omitted. In addition, the active light blind ALB according to the fourth exemplary embodiment of the present invention are substantially the same as described with reference to FIG. 10 and FIG. 11, Therefore, the detailed description thereof will be omitted. Meanwhile, the active diffusion plate AD, the active reflection plate AR, and the active light blind ALB according to the fourth exemplary embodiment of the present invention may be omitted. Hereinafter, the auxiliary light source array LA3 according to the fourth exemplary embodiment of the present invention will be described in detail.

The light source array LA further includes the auxiliary light source array LA3 in addition to the first and the second light source arrays LA1 and LA2. The auxiliary light source array LA3 includes the auxiliary light sources AL and the printed circuit board on which the auxiliary light sources AL are mounted. The auxiliary light sources AL may be implemented to the LED package having a high efficiency, a high luminance, a low power consumption, and the like. The auxiliary light sources AL are turned on or off by receiving the driving voltage from the light source driving unit through the printed circuit board.

The auxiliary light source array LA3 is disposed so that the auxiliary light sources AL irradiate the light toward to the outside of the rear surface of the cover bottom CB. For example, the auxiliary light sources AL of the auxiliary light source array LA3 may irradiate the light toward to the outside of the rear surface of the cover bottom CB through a hole H of the cover bottom CB as shown in FIG. 12. In this case, a bottom end of the case top CT may be formed to cover the auxiliary light source array LA3. In addition, the bottom end of the cover bottom CB is formed to cover the auxiliary light source array LA3, and in that case, the hole H may be formed to expose the auxiliary light sources AL of the auxiliary light source array LA3. Meanwhile, the exemplary embodiment of the present invention is not limited to FIG. 12, the auxiliary light source array LA3 can be transformed to irradiate the light toward to the outside of the rear surface of the cover bottom CB.

Figure 13A:
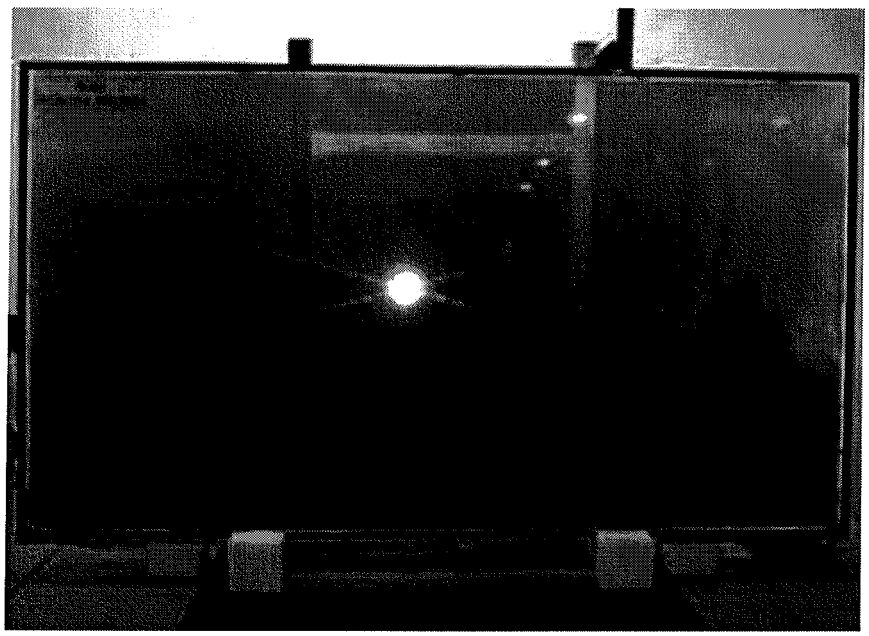
FIGS. 13A and 13B are views showing a transparency according to whether an auxiliary light source is present.
Figure 13B:
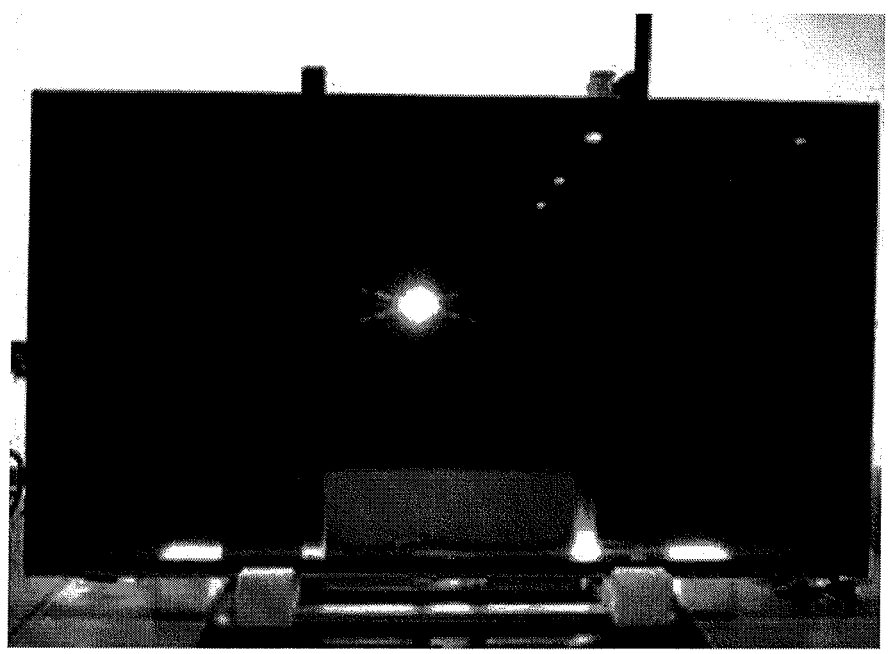

FIGS. 13A and 13B are views showing a transparency according to whether an auxiliary light source is present. FIG. 13A shows transparency with no auxiliary light source in the transparent mode, and FIG. 13B shows transparency with the auxiliary light source in the transparent mode. The plant disposed behind the transparent liquid crystal display device is not seen well in FIG. 13A, however, the auxiliary light sources AL irradiate the light to the plant disposed behind the transparent liquid crystal display device so that the plant becomes well visible in FIG. 13B. In particular, the darker the rear surface of the transparent liquid crystal display device is, the higher the effect of the auxiliary light sources AL is.

As described above, the present invention irradiates the light to the object disposed behind the transparent liquid crystal display device. As a result, the user can clearly see the object disposed behind the transparent liquid crystal display device in the transparent mode. According to this, the user can feel that transparency of the transparent liquid crystal display device is high.

Furthermore, the auxiliary light sources AL may be implemented to the high color rendering LED. The high color rendering LED is an LED, which its high color rendering index is close to that of the light of the sun. The color rendering index is an index estimating how closely embody to reference light, such as the light of the sun and the perfect radiator. The color rendering is a phenomenon which color is seen differently according to the characteristic of the light resource. Eventually, the present invention is implemented the auxiliary light sources AL to the high color rendering LED so that the object disposed behind the transparent liquid crystal display device can be seen close to natural color.

The present invention can proceed the light proceeding toward to the rear surface of the light guide plate into the front of the light guide plate using a plurality of the light source arrays and the light guide plates which the transparent convex patterns are formed. As a result, the present invention may reduce the luminance loss. Accordingly, the present invention can not only make image display quality high but also be implemented more transparently in the transparent mode.

Also, the present invention can be implemented either to display image without turn on the light resources or transparently when the level of illumination of the external light is equal to or higher than the first threshold. Furthermore, the present invention differently controls the brightness of the light sources according to the level of illumination of the external light when the level of illumination of the external light is smaller than the first threshold. As a result, the present invention may reduce the luminance loss.

Also, the present invention includes the active diffusion plate diffusing the light from the light guide plate to the front of liquid crystal display panel in the image display mode in parallel with being implemented transparently in the transparent mode. Also, the present invention includes the active reflection plate reflecting the light from the light guide in the image display mode in parallel with being implemented transparently in the transparent mode. As a result, the present invention can reduce the luminance loss more and make the image quality high.

Also, the present invention is implemented in opaquely to block the light which is incidence in the image display mode by not applying the driving voltage, and is implemented transparently to transmit the light which is incidence in the transparent mode by applying the driving voltage. As a result, the present invention can prevent leaking the light, which penetrates the active reflection plate through the active light blind into the cover bottom in the image display mode.

Furthermore, in the present invention, the auxiliary light sources irradiate the light to the object disposed behind the transparent liquid crystal display device. As a result, the user can clearly see the object disposed behind the transparent liquid crystal display device in the transparent mode. According to this, the user can feel that transparency of the transparent liquid crystal display device is high.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A transparent liquid crystal display device comprising:
   a liquid crystal display panel that displays an image in an image display mode and transparently implementing in a transparent mode;
   a backlight unit including a light guide plate disposed on a rear surface of the liquid crystal display panel and a light source array disposed at one side of the light guide plate;
   a light source driving unit that supplies a driving current to the light sources in order to drive the light sources of the light source array;
   a cover bottom enclosing edge of the side and rear surfaces of the backlight unit; and
   an illumination sensor that measures illumination of an external light incident to the rear surface of the cover bottom,
   wherein, the light source driving unit controls to turn off the light sources when the illumination is equal to or higher that a threshold.

2. The transparent liquid crystal display device of claim 1, wherein the light source driving unit supplies the driving current so that the light sources are turned on with a predetermined brightness when the illumination of the external light is smaller than the threshold.

3. The transparent liquid crystal display device of claim 1, wherein the light source driving unit supplies the driving current so that the brightness of the light sources is changed according to the illumination of the external light when the illumination of the external light is smaller than the threshold.

4. The transparent liquid crystal display device of claim 1, wherein the light guide plate comprises:
   a first light guide plate facing the liquid crystal display panel and including transparent convex patterns formed on an opposite surface to a surface facing the liquid crystal display panel; and
   a second light guide plate facing the cover bottom and including transparent convex patterns formed on a surface facing the cover bottom.

5. The transparent liquid crystal display device of claim 4, wherein the light guide plate further comprises a third light guide plate disposed between the first light guide plate and the second light guide plate, which is not provided with the convex patterns.

6. The transparent liquid crystal display device of claim 4, wherein the convex patterns are formed of spotted ink or chlorinated ink.

7. The transparent liquid crystal display device of claim 4, wherein the light source array comprises:
   a first light source array disposed at one side of the first light guide plate and including the light sources irradiating the light to the one side of the first light guide plate; and
   a second light source array disposed at one side of the second light guide plate and including the light sources irradiating the light to the one side of the second light guide plate.

8. The transparent liquid crystal display device of claim 1, further comprising an active reflection plate disposed between the light guide plate and the cover bottom and increasing a reflectivity of the light from the light guide plate higher in the image display mode than in the transparent mode.

9. The transparent liquid crystal display device of claim 8, wherein the active reflection plate is not applied with the driving voltage in the image display mode and is applied with the driving voltage in the transparent mode.

10. The transparent liquid crystal display device of claim 8, further comprising an active diffusion plate disposed between the liquid crystal display panel and the light guide plate and increasing a diffusivity of the light from the light guide plate higher in the image display mode than in the transparent mode.

11. The transparent liquid crystal display device of claim 10, wherein the active diffusion plate is not applied with the driving voltage in the image display mode and is applied with the driving voltage in the transparent mode.

12. The transparent liquid crystal display device of claim 1, further comprising an active light blind disposed between the light guide plate and the cover bottom, blocking the light from the light guide plate in the image display mode, and transmitting the light from the light guide plate in the transparent mode.

13. The transparent liquid crystal display device of claim 10, further comprising an active light blind disposed between the active reflection plate and the cover bottom, blocking the light from the light guide plate in the image display mode, and transmitting the light from the light guide plate in the transparent mode.

14. The transparent liquid crystal display device of claim 8, wherein the light source array comprises an auxiliary light source array including auxiliary light sources which irradiate the light toward the outside of the rear surface of the cover bottom.

15. A transparent liquid crystal display device comprising:
   a liquid crystal display panel;
   a backlight unit including a light guide plate disposed on a rear surface of the liquid crystal display panel and a light source array disposed at one side of the light guide plate; and
   a cover bottom enclosing an edge of the side and rear surface of the backlight unit,
   wherein, the light guide plate, comprises:
   a first light guide plate facing the liquid crystal display panel and including transparent convex patterns formed on an opposite surface to a surface facing the liquid crystal display panel; and
   a second light guide plate facing the cover bottom and including transparent convex patterns formed on a surface facing the cover bottom.

16. The transparent liquid crystal display device of claim 15, wherein the light guide plate further comprises a third light guide plate disposed between the first light guide plate and the second light guide plate, which is not provided with the convex patterns.

17. The transparent liquid crystal display device of claim 15, wherein the light source array comprises:
- a first light source array disposed at one side of the first light guide plate and including the light sources irradiating the light to the one side of the first light guide plate; and
- a second light source array disposed at one side of the second light guide plate and including the light sources irradiating the light to the one side of the second light guide plate.

18. The transparent liquid crystal display device of claim 15, further comprising an active reflection plate disposed between the light guide plate and the cover bottom and increasing a reflectivity of the light from the light guide plate higher in the image display mode in which the liquid crystal display panel displays the image than in the transparent mode in which the liquid crystal display panel is transparently implemented.

19. The transparent liquid crystal display device of claim 15, further comprising an active diffusion plate disposed between the liquid crystal display panel and the light guide plate and increasing a diffusivity of the light from the light guide plate higher in the image display mode in which the liquid crystal display panel displays the image than in the transparent mode in which the liquid crystal display panel is transparently implemented.

20. The transparent liquid crystal display device of claim 15, further comprising an active light blind disposed between the light guide plate and the cover bottom, blocking the light from the light guide plate in the image display mode in which the liquid crystal display panel displays the image, and transmitting the light from the light guide plate in the transparent mode in which the liquid crystal display panel is transparently implemented.

21. The transparent liquid crystal display device of claim 15, wherein the light source array comprises an auxiliary light source array including auxiliary light sources which irradiate the light toward the outside of the rear surface of the cover bottom.

* * * * *